(12) United States Patent
Izabel et al.

(10) Patent No.: US 9,566,950 B2
(45) Date of Patent: Feb. 14, 2017

(54) HYDRAULIC AND/OR ELECTRICAL CONNECTION INTERFACE FOR WINDSCREEN WIPER

(71) Applicant: Valeo Systèmes d'Essuyage, Le Mesnil Saint Denis (FR)

(72) Inventors: Vincent Izabel, Chilly Mazarin (FR); Jean-Michel Jarasson, Le Mesnil St Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 78 days.

(21) Appl. No.: 14/276,480

(22) Filed: May 13, 2014

(65) Prior Publication Data
US 2014/0331435 A1 Nov. 13, 2014

(30) Foreign Application Priority Data
May 13, 2013 (FR) ..................................... 13 54274

(51) Int. Cl.
*B60S 1/38* (2006.01)
*B60S 1/40* (2006.01)
*B60S 1/52* (2006.01)

(52) U.S. Cl.
CPC ............ *B60S 1/4048* (2013.01); *B60S 1/3862* (2013.01); *B60S 1/524* (2013.01); *B60S 2001/4051* (2013.01); *B60S 2001/4061* (2013.01)

(58) Field of Classification Search
CPC .............................. B60S 1/4038–1/4048; B60S 2001/4051–2001/4061; B60S 1/4064
USPC ...................................................... 15/250.32
See application file for complete search history.

(56) References Cited

U.S. PATENT DOCUMENTS

| | | | | |
|---|---|---|---|---|
| 2,206,343 | A | * | 7/1940 | Zaiger ................... B60S 1/4003 15/250.32 |
| 2,974,341 | A | * | 3/1961 | Hart ......................... B60S 1/40 15/250.32 |
| 2011/0185531 | A1 | * | 8/2011 | Egner-Walter .......... B60S 1/381 15/250.01 |
| 2012/0167326 | A1 | * | 7/2012 | Egner-Walter ........ B60S 1/3805 15/250.01 |

FOREIGN PATENT DOCUMENTS

WO   2012072748 A1   6/2012

* cited by examiner

*Primary Examiner* — Larry E Waggle, Jr.
*Assistant Examiner* — Andrew A Horton
(74) *Attorney, Agent, or Firm* — Osha Liang LLP

(57) ABSTRACT

The invention relates to an assembly for producing a vehicle windscreen wiper system, comprising an end piece (12) of a wiper holder, said wiper holder being intended to move a wiper (14), a connection interface (20) and an intermediate piece (30), said assembly being able to take up a working position in which said interface (20) is free with respect to said end piece (12) and a service position in which said interface (20) is retained in an oriented manner with respect to said end piece (12) by said intermediate piece (30).

Figure 1:
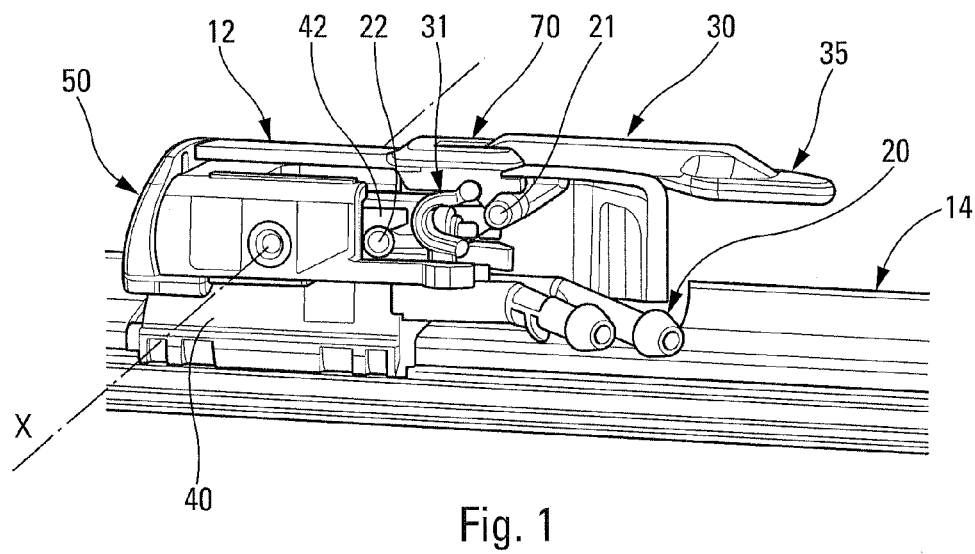

The invention also relates to a connecting device for a vehicle windscreen wiper system, comprising the assembly as above, a connector (40) intended to be fixed to said wiper (14) and an adapter (50) for attaching the connector (40) to said wiper holder.

The invention also relates to a vehicle windscreen wiper system.

20 Claims, 8 Drawing Sheets

HYDRAULIC AND/OR ELECTRICAL CONNECTION INTERFACE FOR WINDSCREEN WIPER

The field of the present invention is that of equipment for vehicles, and more particularly that of equipment for wiping the windows of motor vehicles.

Motor vehicles are commonly equipped with windscreen wiper systems for washing the windscreen and avoiding disruption to the driver's view of his surroundings. These windscreen wipers are conventionally driven by arms or a wiper holder that carry or carries out an angular to-and-fro movement and have elongate wipers which themselves carry squeegee blades made of a resilient material. These blades rub against the windscreen and evacuate the water by removing it from the driver's field of view. The wipers are produced in the form either, in a conventional version, of articulated yokes which hold the squeegee blade at a number of discrete locations or, in a more recent version, known as the "flat blade" version, of a semi-rigid assembly which holds the squeegee blade along its entire length. In both solutions, the wiper is attached to the turning wiper holder of the windscreen wiper by an assembly consisting of a mechanical connector and an adaptor. The mechanical connector is a piece which is crimped onto the yoke or directly onto the flat blade, while the adaptor is an intermediate piece which allows the connector to be fastened to the wiper holder of the windscreen wiper. These two pieces are connected to one another by a transverse pin that allows their relative rotation in a plane perpendicular to the windscreen and passing through the wiper holder.

It is also known to provide vehicles with devices for supplying a windscreen washer liquid which is fed from a tank located under the bonnet and which is sprayed in the direction of the windscreen by nozzles located either in the vicinity of the windscreen or on the windscreen wiper itself for better distribution of the liquid. In the case of nozzles positioned on the wipers, the windscreen washer liquid is fed through pipes which are fixed to the windscreen wiper holder and which are attached to the wiper in the region of the mechanical connector by a connection interface. The connection interface is fixed to the mechanical connector by appropriate end fittings and provides the necessary seal with said mechanical connector.

While the pipes for liquid and the connection interface are generally connected to the windscreen wiper holder, the mechanical connector is connected to the wiper and it is necessary to connect the connection interface to the mechanical connector when changing the wiper. This operation is carried out in a position known as the service position.

It is necessary to ensure that the connection interface is correctly aligned during installation in the mechanical connector, failing which incorrect assembly would be reflected by a risk of windscreen washer liquid leaking at the junction between the two connectors.

In addition, during the decoupling or removal of the wiper from the wiper holder, it is important that the connection interface remains attached to the wiper holder. This prevents the connection interface from being carried along by the mechanical connector during the movement separating it from the windscreen wiper holder.

However, once the wiper has been mounted in the arm, it is necessary for the connection interface not to limit the necessary freedom of movement in rotation of the adapter with respect to the mechanical connector.

To this end, windscreen wipers are known, where the connection interface is held in the service position by snap-fastening it in openings in an intermediate piece inside the wiper holder, as described in the application WO2012072748.

However, some users have had difficulty fitting the wiper in the service position since this is carried out inside the wiper holder, without being visible to the user.

The aim of the present invention is to remedy these drawbacks entirely or in part.

To this end, the invention relates to an assembly for producing a vehicle windscreen wiper system, comprising an end piece of a wiper holder that is intended to move a wiper, a connection interface and an intermediate piece, said assembly being able to take up a working position in which said interface is free with respect to said end piece and a service position in which said interface is retained in an oriented manner with respect to said end piece by said intermediate piece.

According to the invention, at least a part of said intermediate piece, known as a lever, is configured to be accessible so as to be able to be rotated in order to pass from the working position to the service position.

The mounting operations are thus rendered easier, since they make use of an intuitive lever movement. Furthermore, the intermediate piece to be actuated, namely the lever, is visible from the outside.

According to various embodiments of the invention, which may be taken together or separately:
  said assembly has at least a first stud located on one of the elements comprising said lever and said interface, and at least one housing located on the other element, the housing(s) being able to retain said first stud(s) in the service position.
  said first stud(s) is/are cylindrical,
  said housing(s) is/are located on said lever,
  said housing(s) is/are able to rotate,
  said housing(s) define(s) a first abutment,
  said housing(s) is/are hooks,
  said hooks are at least partially cylindrical,
  said hooks are open and produced in one piece with said lever,
  said end piece and/or said wiper holder define(s) a second abutment that is able to prevent said interface from pivoting inside said end piece in the service position,
  said interface has an external geometry that is able to cooperate with said second abutment,
  said interface comprises at least one hydraulic connector and/or an electrical connector,
  said interface has means that are able to immobilize it on a connector of the wiper in the working position, said means being second studs, different from the first stud(s),
  said second studs are cylindrical and able to be retained by mating shapes, said mating shapes being at least partially cylindrical and belonging to said connector of the wiper,
  said interface comprises means for locking the hydraulic connector to said electrical connector,
  said lever comprises a handle for moving it from said working position to said service position,
  said handle covers at least a part of said wiper holder,
  said handle is located on a face of said wiper holder that is intended to face away from the wiper,
  said lever is configured such that, in the working position, the handle takes up a position parallel to the longitudinal direction of the wiper holder, said lever is configured such that, in the service position, the handle takes up a position at right angles to the longitudinal direction of the wiper holder, the end piece comprises a window for said lever to pass through, said assembly comprises an additional piece secured to the end piece and configured to allow an articulation between said lever and said end piece.

The invention also relates to a connection device comprising an assembly as described above, a connector intended to be fixed to said wiper and an adapter for attaching the connector to said wiper holder.

According to various embodiments of the invention, which may be taken together or separately:

said adapter comprises holding means for holding on to the wiper holder in the working position, said lever comprising means for locking said holding means, so as to retain the adapter on the wiper holder, the adapter is connected to the connector so as to be mounted on the wiper holder with a degree of pivoting about a first rotation axis, said adapter is configured to be mounted on the wiper holder in a direction known as the mounting/removal direction that is located in a plane perpendicular to said first rotation axis, said lever is able to rotate about a second rotation axis, said second axis belonging to the end piece and being parallel to the first rotation axis, the holding means comprise at least one lug that is retractable in a direction known as the retraction direction, said retraction direction comprising a component parallel to said first rotation axis, said lugs(s) is/are able to be housed in the working position inside one or more slots provided in the wiper holder, said slots are through-slots, said lugs and said slots have respective sizes that prevent said lugs from being manipulated, said locking means comprise at least one projecting part produced in one piece with a body of the lever comprising said hooks, said projecting part(s) define(s) a third abutment that is able to prevent the retraction of said lugs(s) in the working position, said projecting part(s) is/are located in the region of the hooks, said lugs(s) and/or said slot(s) is/are configured to allow the retraction of the lug(s) in the service position, said lugs(s) is/are, each, located on a tab produced in one piece with a body of the adapter, in the region of which the first rotation axis is located, said tab(s) of the adapter is/are configured to bend so as to allow said lug(s) to retract.

The invention also relates to a vehicle windscreen wiper system comprising a wiper, a wiper holder and a device as described above for attaching said wiper to said wiper holder.

Figure 2:
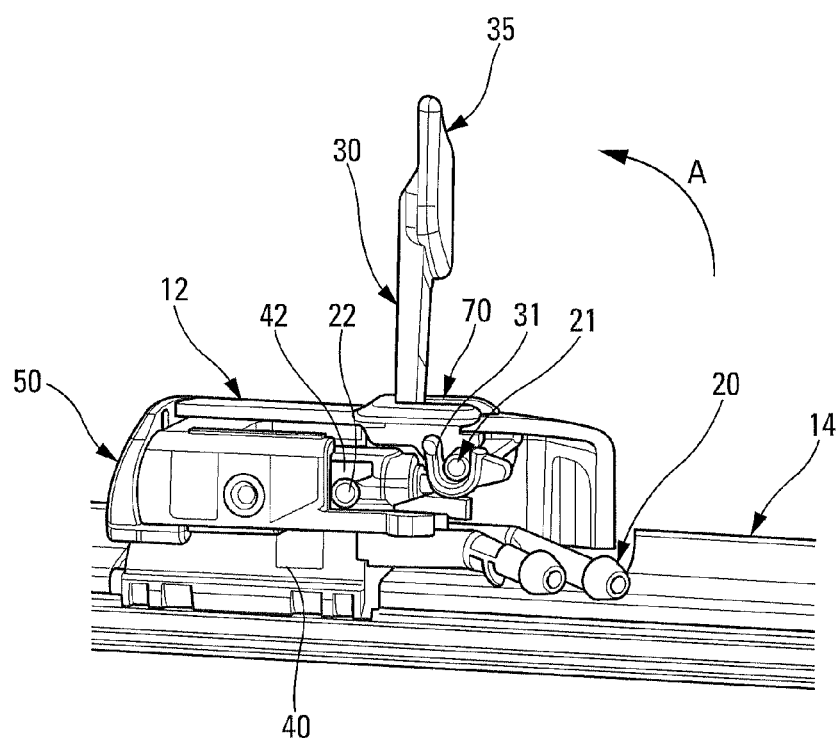
Figure 3:
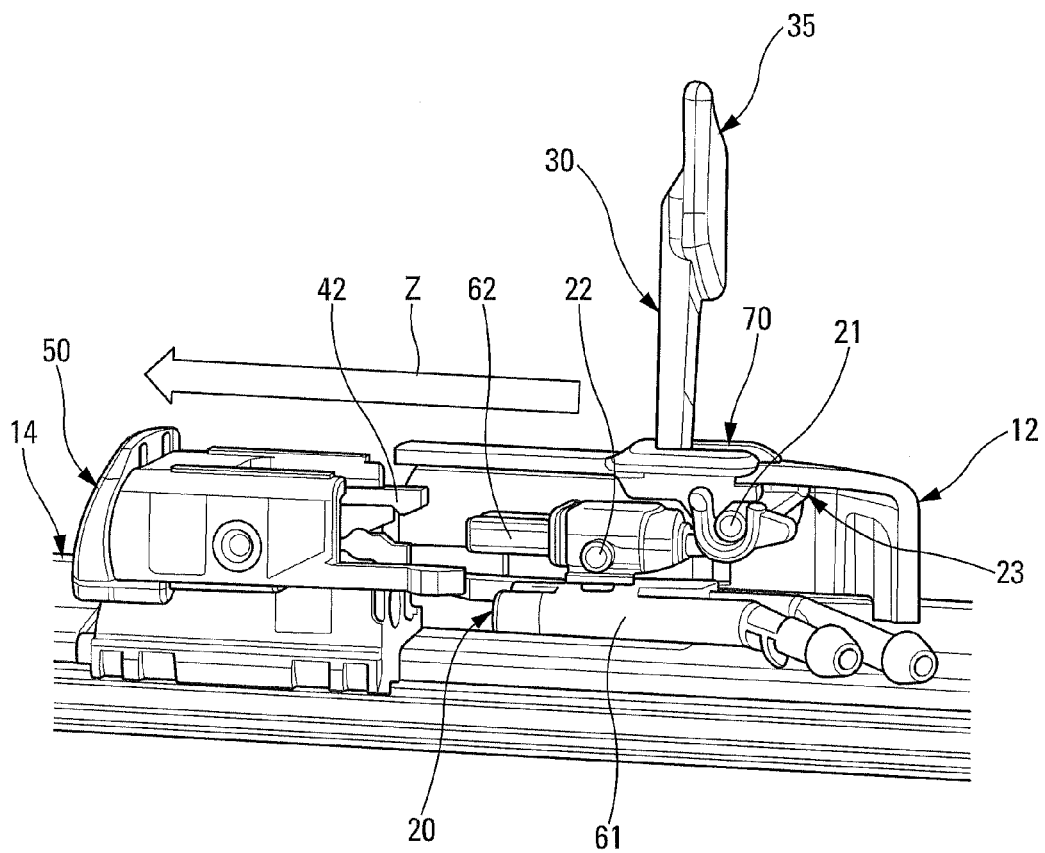
Figure 4:
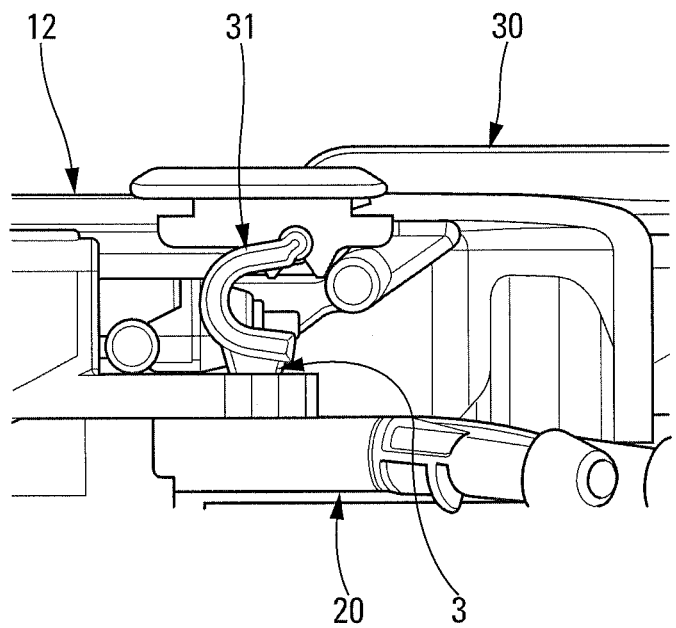
Figure 5:
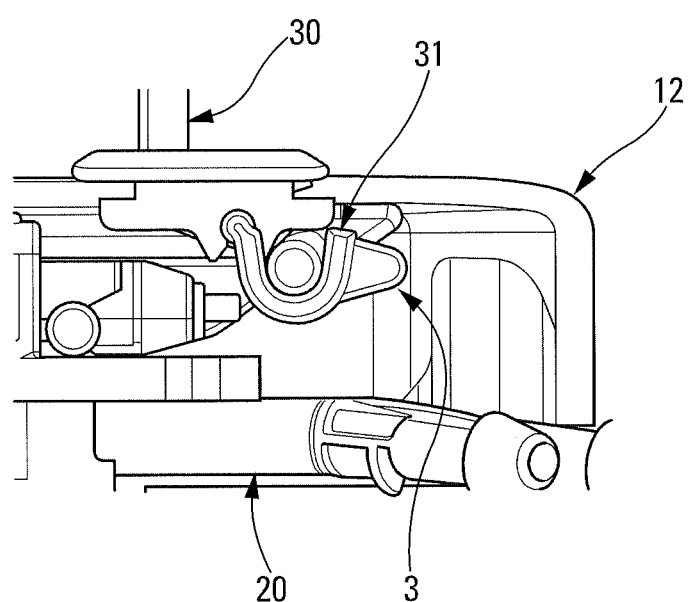
Figure 6:
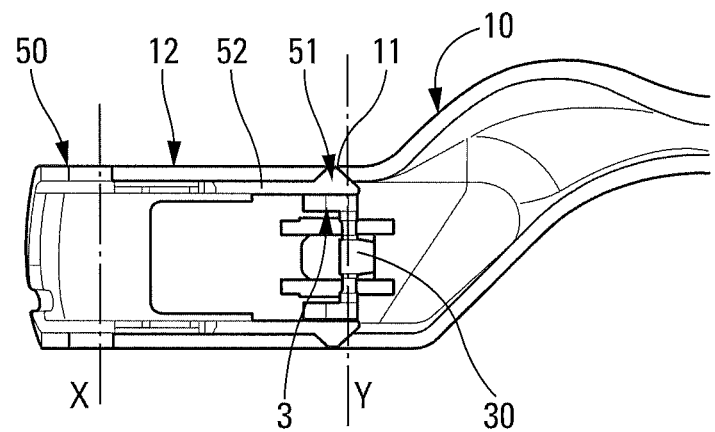
Figure 7:
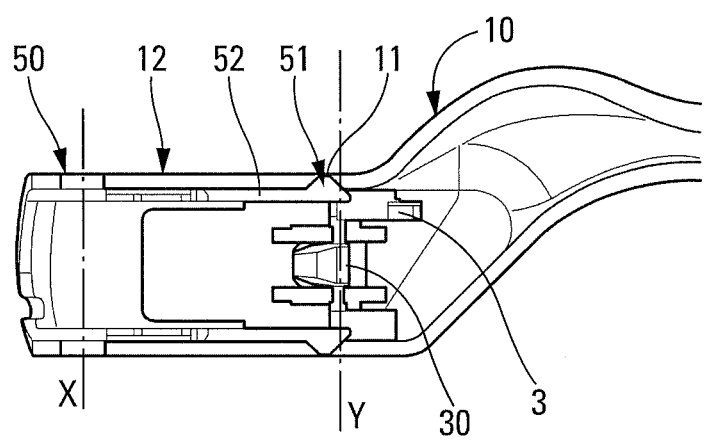
Figure 8:
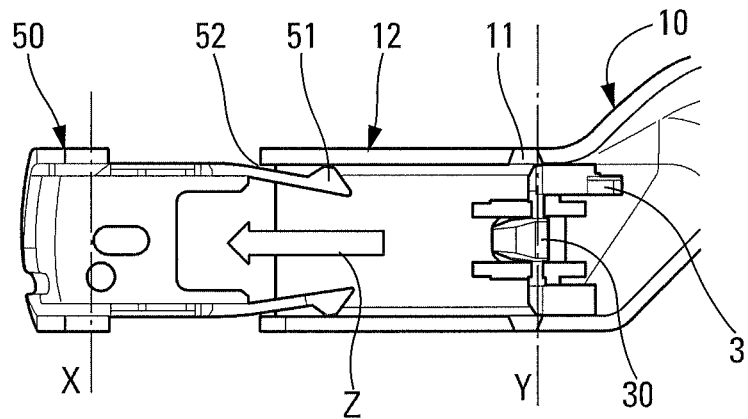
Figure 9:
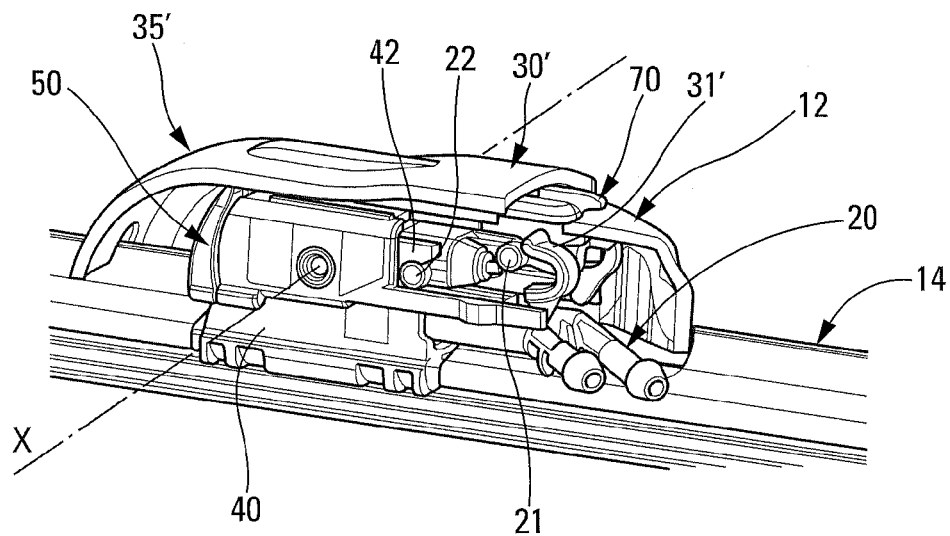
Figure 10:
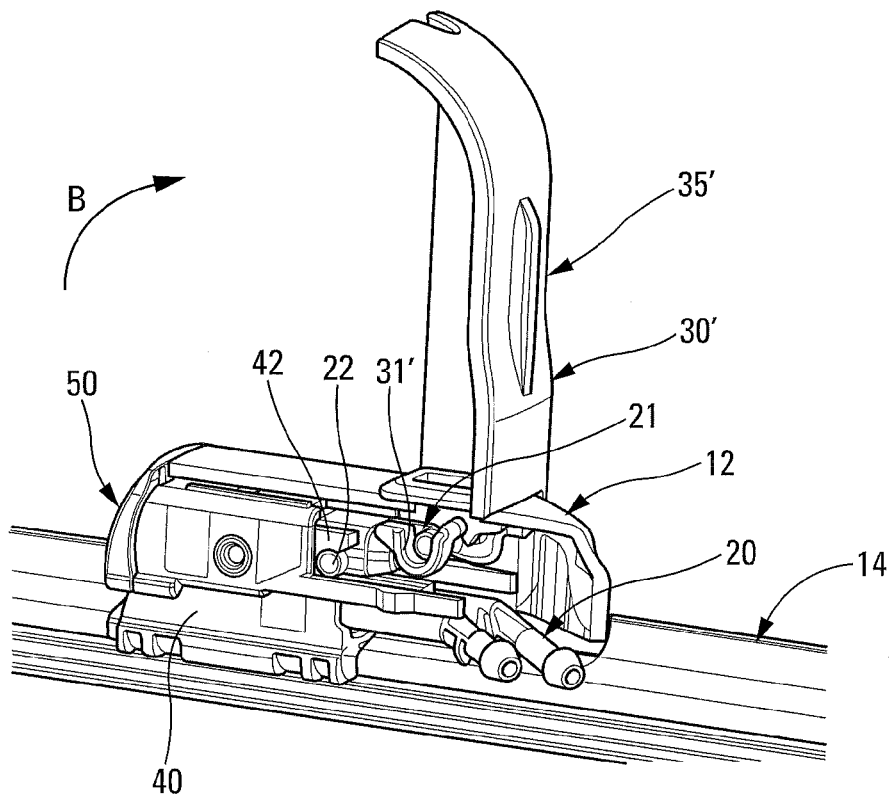
Figure 11:
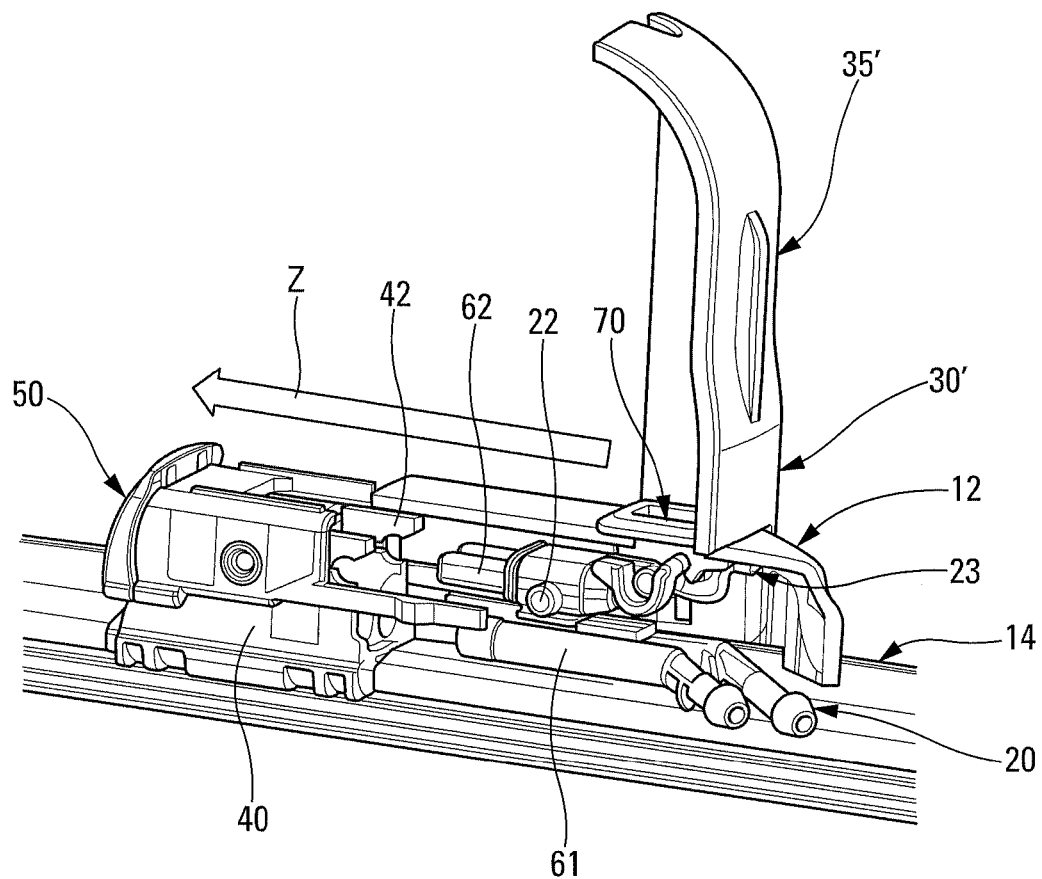
Figure 12:
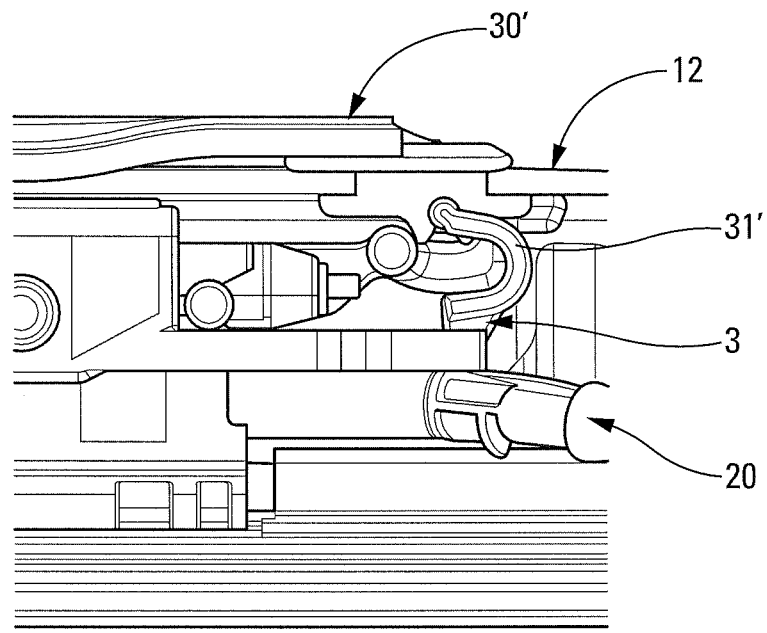
Figure 13:
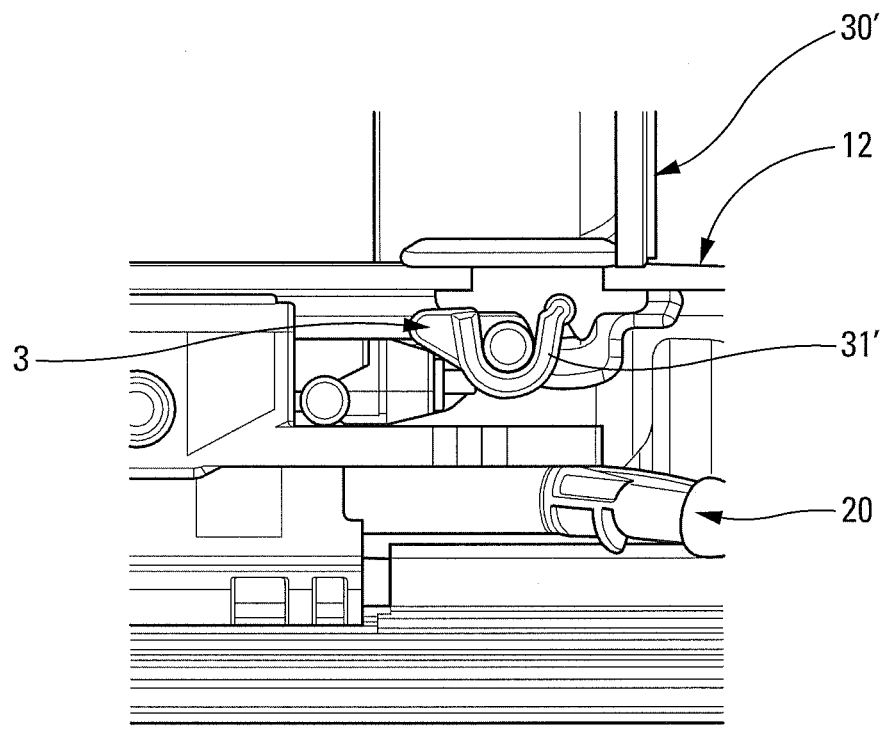
Figure 14:
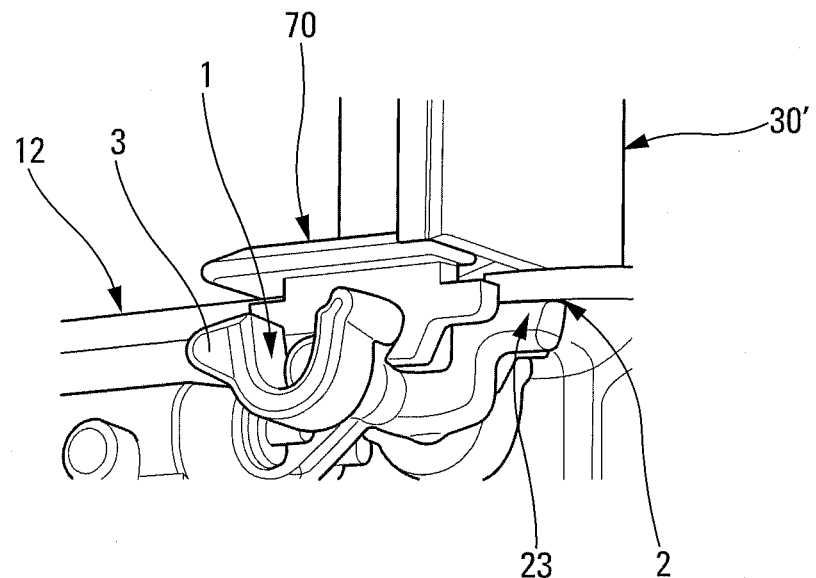
Figure 15:
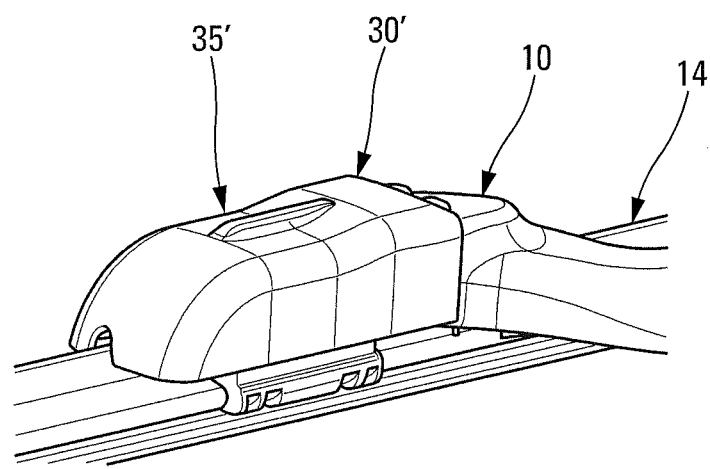

The invention will be better understood, and further aims, details, features and advantages thereof will become more clearly apparent from the following detailed explanatory description of at least one embodiment of the invention, given purely by way of illustrative and nonlimiting example, with reference to the appended schematic drawings, in which:

FIG. 1 is a perspective view partially showing an exemplary embodiment of a wiper system according to the invention in the working position, the end piece of the wiper holder being cut away in order to reveal the connection interface, the intermediate piece, known as a lever, and also the connector and the adapter of said system, FIG. 2 repeats FIG. 1 and shows how the lever is manipulated in order to drive the interface from the working position to the service position, FIG. 3 repeats the preceding figures during the removal of the wiper from said system, FIG. 4 is a detail view of the connection device of the wiper system from the preceding figures in the working position, in the region of the interface and lever parts that cooperate with one another, FIG. 5 repeats FIG. 4 in a configuration close to the service position, FIG. 6 is a bottom view of the connection device of the wiper system from the preceding figures in the working position, only the wiper holder, the adapter and the lever being shown, FIG. 7 repeats FIG. 6, with the system being in the service position, FIG. 8 repeats FIGS. 6 and 7 during the removal of the wiper, FIG. 9 is a perspective view partially showing another exemplary embodiment of the wiper system according to the invention in the working position, the end piece of the wiper holder and the handle of the lever being cut away to reveal the connection interface, the detail of said lever, and also the connector and the adapter of said system, FIG. 10 repeats FIG. 9 and shows how the lever is manipulated to drive the interface from the working position to the service position, FIG. 11 repeats FIGS. 9 and 10 during the removal of the wiper from the said system, FIG. 12 is a detail view of the connection device of the wiper system from FIGS. 9 to 11 in the working position, in the region of the interface and lever parts that cooperate with one another, FIG. 13 repeats FIG. 12 in a configuration close to the service position, FIG. 14 is a detail view of said parts in the service position, FIG. 15 is a perspective view of the wiper system from FIGS. 9 to 14 in the working position.

As illustrated in the various figures, the invention relates to a vehicle windscreen wiper system. This system comprises an arm or wiper holder 10 which has an end part or arm head 12 that is known as the end piece in the following text. The wiper holder 10 is intended to move a wiper 14 of said wiper system over the surface of a vehicle windscreen.

The wiper 14 is attached to the wiper holder 10 by a mechanical connector 40 and an adapter 50 of a connection device of said wiper system. The mechanical connector 40 is a piece which, for example, is crimped onto the blade 14. The adapter 50 is an intermediate piece which makes it possible to fix the connector 40 to the end piece 12 of the wiper holder 10. These two pieces are connected together by a transverse pin which allows their relative rotation in a plane perpendicular to the windscreen and passing through the wiper holder 10.

The axis X of this transverse pin is visible in FIGS. 1 and 9. A connection interface 20 of said connection device is also visible in this FIG. 1. This connection interface 20 makes it possible to supply the wiper 14 with windscreen washer liquid and/or electricity when it is intended to be able to heat the structure of said wiper 14, for example.

Said end piece 12 forms, with a connection interface 20 and an intermediate piece 30, 30', an assembly, said assembly being able to take up a working position in which said interface 20 is free with respect to said end piece 12 and a service position in which said interface 20 is retained in an oriented manner with respect to said end piece 12 by said intermediate piece 30, 30'.

More specifically, the working position is the position in which the wiper 14 is joined to the wiper holder 10. In the working position, the interface 20 is free with respect to the end piece 12 but it is held with respect to the wiper 14.

The service position is the position in which the wiper 14 is disassembled from the wiper holder 10. In the service position, the interface 20 is retained in an oriented manner inside the end piece 12.

According to the invention, at least a part of said intermediate piece 30, 30' is configured to be accessible so as to be able to be rotated, in particular about an axis Y of the end piece 12, in order to pass from the working position to the service position. A lever, which is advantageously manipulable from the outside, is thus provided.

The lever 30, 30' is able to rotate about the rotation axis Y, belonging to the end piece 12, provided parallel to the rotational axis X of the adapter on the mechanical connector.

In addition, said adapter 50 is configured to be mounted on the wiper holder 10 in a direction Z known as the mounting/removal direction that is located in a plane perpendicular to said first rotation axis X.

In FIGS. 1, 2, 9 and 10, first studs 21 that are located on the connection interface 20, and also housings 31, 31' that are located on the intermediate piece 30, 30' known as a lever, are visible. There are preferably two of said first studs 21, which are located on the side faces of the interface 20, opposite one another with respect to the longitudinal direction of said interface 20, said interface 20 being oriented in the longitudinal direction of the end piece 12. These first studs 21 are preferably cylindrical.

Said housings 31, 31' are able to retain said first studs 21, in particular in the service position. They are located on the lever 30, 30' and there are preferably two thereof, positioned opposite said studs 21. They are able to rotate, like the lever 30, 30', and define a first abutment 1 for said first studs 21. This first abutment 1 is particularly visible in FIG. 14 in the embodiment in question.

Said housings 31, 31' are at least partially cylindrical hooks that are produced in one piece with said lever 30, 30'.

The housings 31, 31' act as first abutments 1 between the interface 20 and the lever 30, 30'. For this reason, any other form is conceivable for said first studs 21, which may also be parallelepipedal or pyramid-shaped for example.

The first studs 21 are particularly advantageous since they are involved in the passage of the assembly according to the invention from the working position to the service position.

In the working position, the interface 20 is held with respect to the wiper 14 by a connector 40 which has characteristic shapes that allow said connection interface 20 to be retained. These are partially cylindrical mating shapes 42 which cooperate with second studs 22 belonging to the connection interface 20. The mating shapes 42 are not closed and each have an opening that is taken by each of the second studs 22 of the connection interface in order to be housed therein. There are preferably two of these second studs 22 of the connection interface, located on side faces of the interface 20, opposite one another with respect to a longitudinal direction of extension of said interface 20. Said second studs 22 are closer to the mechanical connector 40 than said first studs 21 may be.

It should be noted that in the working position, the lever advantageously does not come into contact with the interface 20, as is visible in FIGS. 1 and 9.

On the other side, a second abutment 2 defined by the end piece 12 is visible in FIG. 14. This second abutment is able to prevent said interface 20 from pivoting inside said end piece 12, in particular in the case of first cylindrical studs 21. This is made possible by the external geometry 23 of said interface 20, which is able to cooperate with said second abutment 2. This second abutment 2 prevents said interface 20 from pivoting in the end piece 12 during the decoupling of the wiper 14 from the end piece 12. Specifically, said second abutment 2 is configured to bear against the interface 20, in particular against a substantially flat part 23 of said interface 20. Said substantially flat part 23 is preferably located on the side of said interface 20 that is opposite its distal end with respect to said first studs.

Double locking of said interface 20 inside the end piece 12 is thus produced with the aid of the first and second abutments 1, 2 described above, and, in the embodiments illustrated, it is said first and second abutments 1, 2 which, with the shapes provided in a mating manner on the connection interface 20, namely the first stud(s) 21 and the substantially flat part 23, make it possible to orient the connection interface 20 in order to make it easier to mount a new wiper.

The passage from the working position to the service position is particularly visible in FIGS. 2 and 10.

The assembly according to the invention in the service position is illustrated in FIGS. 3 and 11.

It can be observed therein that the interface 20 is retained by the hooks 31, 31' of the lever 30, 30' inside the end piece 12. These figures also illustrate the second locking of the interface 20 inside the end piece 12 by way of the substantially flat part 23 of said interface.

It can be seen therein that the second studs 22 are no longer engaged in the mating shapes 42 of the connector 40.

It can also be observed therein that the interface 20 is no longer coupled to the wiper 14, the adapter 50 having been disassembled from the end piece 12.

Besides the connector 40 and the adapter 50 for attaching the connector 40 to the wiper holder 10, the connection device according to the invention comprises an assembly as described above.

FIGS. 6, 7 and 8 illustrate said adapter 50. This adapter 50 comprises holding means 51 for holding on to the wiper holder 10 in the working position. Advantageously, said lever 30, 30' comprises means 3 for locking said holding means 51, so as to retain the adapter 50 on the wiper holder 10.

The working position is ensured here by lugs 51 belonging to the adapter 50, which engage in slots 11 in the wiper holder 10. These lugs 51 may have a parallelepipedal, cylindrical or pyramid shape or any other shape as long as they are able to be housed inside the slots 11 in the arm 10. There are preferably two of said lugs 51, each belonging to a flexible tab 52 of the adapter 50. Specifically, the adapter 50 has two flexible tabs 52 which extend, in a direction perpendicular to the transverse axis X, towards the wiper holder 10. These two flexible tabs 52 may be located on each side of the adapter 50, in a symmetrical manner with respect to a plane perpendicular to the transverse axis X.

The slots 11 are in this case recesses, preferably through-recesses, that are located in the end piece 12. The slots 11 have a shape suitable for housing said lugs 51. These recesses may be obtained directly during the forming of the wiper holder 10, or by subsequent treatment, for example by machining operations carried about locally on the end piece 12. There are preferably two of the slots 11, located on each side of the end piece 12, in a symmetrical manner with respect to a plane perpendicular to the transverse axis X.

The respective size of the lugs 51 and the recesses 11 in this case prevents them from being manipulated by a user. In other words, on account of their sizing and also on account of the sizing of the recesses 11, the lugs 51 are configured such that a user cannot manually disengage them, in particular on account of their small section and/or the large thickness of the walls of the end piece 12.

However, the user may disengage said lugs 51 from the slots 11 in the manner which will be described below.

FIGS. 4 and 12 show detail views of the locking means 3 of the device according to the invention, the assembly of the invention being in the working position. Said locking means 3 comprise at least one projecting part 3 produced in one piece with the lever 30, 30'. Said projecting parts 3 define a third abutment that is able to prevent the retraction of said lugs 51 in the working position. There are preferably two of said abutments, each located in the region of the hooks 31, 31' and able to rotate like the latter.

Furthermore, said lugs 51 are retractable in a direction known as the retraction direction, said retraction direction comprising a component parallel to said first rotation axis X. Specifically, as mentioned above, said lugs 51 are located on a tab 52 produced in one piece with the adapter 50. Their retraction is obtained by the bending of said tabs 52 of the adapter 50.

In the working position, the projecting parts 3 come into abutment against said tabs 52 and prevent them from bending in the retraction direction.

FIG. 7 is also a bottom view of the device according to the invention, the holding means 51 not being locked, only the wiper holder 10, the adapter 50 and the lever 30, 30' being shown.

The lever 30, 30' has been pivoted with respect to the second rotation axis Y so as to release the third abutments 3.

FIGS. 5 and 13 show detail views of the locking means of the device according to the invention, the assembly of the invention being close to the service position. In these figures, it is particularly visible that the projecting parts 3 no longer prevent the bending of the tabs 52 of the adapter 50, the projecting parts 3 no longer being in abutment against said tabs 52.

FIG. 8 is another bottom view of the device according to the invention, the holding means 51 being retracted into the end piece 12, only the wiper holder 10, the adapter 50 and the lever 30 being shown.

The direction Z known as the mounting/removal direction, in which said adapter 50 is configured to be mounted on the wiper holder 10, is visible in this figure. In FIG. 8, the direction given to this direction Z is that of the removal of the adapter 50 from said end piece 12. Said direction Z is also referenced in FIGS. 3 and 11.

Said lugs 51 and said slots 11 are configured to allow the retraction of said lugs in the service position. Specifically, they have shapes which allow their disengagement from one another. Said shapes are, for example, slopes such as chamfers.

Thus, between the working position and the service position, as illustrated in FIG. 8, the shapes act so as to make it easier to remove the lugs 51 from the slots 11 of the wiper holder 12, by causing the tabs 52 of the adapter 50 to bend, in the retraction direction.

As already stated, the lugs 51 are not manually accessible on account of their small size. Only a movement, for example in rotation, of said lever 30, 30' with respect to the end piece 12 is able to allow the disengagement of the locking means and thus authorizes the decoupling of the adapter 50 and the arm 12, the lugs 51 then being free to leave the slots 11 in the arm 10.

Said connection interface preferably allows the hydraulic and/or electrical connection of a wiper 14 having an onboard washing function and/or a system for heating its structure. In particular, this invention relates to the hydraulic and/or electrical connection and disconnection of the wiper 14 from the wiper holder 10 in a single movement during the disassembly of the wiper 14 from its wiper holder 10.

A first part of the present description introduced the lever 30, 30' which retains, inter alia, the first lugs 21 of the connection interface during the passage from the working position to the service position, the service position corresponding to the position in which it is possible to disassemble the wiper 14 and the wiper holder 10, the connection interface 20 then being held in an oriented manner with respect to the wiper holder by a second abutment 2 which cooperates with the substantially flat part 23 of said interface 20, described above.

A second part of the present description showed that the connection interface 20 is retained on the wiper 14 via the connector 40 in the working position, namely when the wiper 14 and the wiper holder 10 are assembled, while allowing the wiper 14 to rotate with respect to the wiper holder 10 about the axis X.

A third part of the present description explained the role of the adapter 50, the flexible tabs 52 of which have lugs 51 which hold it inside the wiper holder 10, more specifically inside an end piece 12 of the wiper holder 10. In this third part, a complementary function of the lever 30, 30' was explained in detail, i.e. the locking function of said lugs 51 in the working position.

In order to complete the present description, it should be noted that the disassembly action may be carried out once the lever 30, 30' has been pivoted with respect to the end piece 14 of the wiper holder 10. This is made possible since at least one part of the lever 30, 30' is accessible so as to be able to be manipulated to pass from the working position to the service position. This part forms, for example, a handle 35, 35' of the lever 30, 30'.

Said handle 35, 35' covers at least a part of said wiper holder and is located on a face of the wiper holder 10 that is intended to face away from the wiper 14. In the working position, this handle 35, 35' takes up a position parallel to the longitudinal direction of the wiper holder 10, and in the service position, it takes up a position at right angles to the longitudinal direction of the wiper holder 10.

According to a first embodiment of the invention which is illustrated in FIGS. 1 to 5, the handle 35 covers only a part of the end piece 12 of the wiper holder 10. Moreover, in the working position, the distal part of the handle 35 faces towards the wiper holder 10.

In order to pass into the service position, it is sufficient to subject the lever 30 to a rotation through a quarter of a circle in the anticlockwise direction, referenced by the arrow A in FIG. 2. This causes the hooks 31 to rotate through the same quarter of a circle. Said hooks 31 then retain the first studs 21 and unlock the flexible tabs 52 in order to allow the lugs 51 to disengage from the slots 11 provided in the end piece 12 of the wiper holder 10. The user can then disassemble the wiper 14 from the wiper holder 10 by pulling longitudinally on the wiper 14 in the direction Z, while remaining sure that the connection interface 20 of such a wiper assembly is held in the end piece 12.

According to a second embodiment of the invention which is illustrated in FIGS. 9 to 15, the handle 35' is intended to cover the end piece 12 of the wiper holder 10, the connector 40 and the adapter 50. The handle 35' is then a covering cap which can be clip-fastened to the wiper 14. Moreover, in the working position, the distal part of the handle 35' faces away from the wiper holder 10.

In order to pass into the service position, it is sufficient to subject the lever 30' to a rotation through a quarter of a circle in the clockwise direction, referenced by the arrow B in FIG. 10. This causes the hooks 31' to rotate through the same quarter of a circle. Said hooks 31' then retain the first studs 21 and unlock the flexible tabs 52 in order to allow the lugs 51 to disengage from the slots 11 provided in the end piece 12 of the wiper holder 10. The user can then disassemble the wiper 14 from the wiper holder 10 by pulling longitudinally on the wiper 14 in the direction Z, while remaining sure that the connection interface of such a wiper assembly is held in the end piece 12.

With regard to the two embodiments, the passage from the service position to the working position is carried out by reverse operations.

It should be noted that in the examples described above, the connection interface 20 comprises a hydraulic connector 61 and an electrical connector 62, as is particularly visible in FIGS. 3 and 11, said interface 20 comprising means for locking the hydraulic connector 61 to the electrical connector 62 (locking means not shown in detail in the figures).

Here, the first and second lugs 21, 22 are provided on the electrical connector 62 rather than on the hydraulic connector 61. However, it is possible to provide them on the hydraulic connector.

It should also be noted that other variant embodiments are of course possible. In particular, it is also conceivable, in an additional embodiment, for the first and second lugs of said assembly to be located on the lever 30, 30', with the abutments, for their part, being located on the interface 20.

It should also be noted that the end piece 12 comprises a window for said lever 30, 30' to pass through. The above mentioned assembly comprises in this case an additional piece 70 secured to the end piece 12 and configured to allow an articulation between said lever 30, 30' and said end piece 12.

The invention claimed is:

1. An assembly for producing a vehicle windscreen wiper system, comprising:
    an end piece of a wiper holder that intended to move a wiper;
    a connection interface; and
    an intermediate piece, said assembly being able to take up a working position in which said interface is free with respect to said end piece and a service position in which said interface is retained in an oriented manner with respect to said end piece by said intermediate piece,
    wherein at least a lever of the intermediate piece is configured to be accessible to be able to be rotated in order to pass from the working position to the service position,
    wherein, in the working position, the wiper and the wiper holder are securely attached, and
    wherein, in the service position, the wiper and the wiper holder are detachable.

2. The assembly according to claim 1, further comprising at least a first stud located on one of the elements comprising said lever and said interface, and at least one housing located on the other element, the housing(s) being able to retain said first stud(s) in the service position.

3. The assembly according to claim 2, wherein said housing(s) is/are located on said lever.

4. The assembly according to claim 2, wherein said housing(s) is/are able to rotate.

5. The assembly according to claim 2, wherein the housing(s) define(s) a first abutment.

6. The assembly according to claim 5, wherein said end piece and/or said wiper holder define(s) a second abutment that is able to prevent said interface from pivoting inside said end piece in the service position.

7. The assembly according to claim 2, wherein said lever comprises a handle for moving the lever from said working position to said service position.

8. The assembly according to claim 7, wherein said handle is located on a face of said wiper holder that faces away from the wiper.

9. The assembly according to claim 2, wherein the end piece comprises a window for said lever to pass through.

10. The assembly according to claim 2, further comprising an additional piece secured to the end piece and configured to allow an articulation between said lever and said end piece.

11. The assembly according to claim 1, wherein said interface comprises at least one hydraulic connector and/or an electrical connector.

12. A connection device for a vehicle windscreen wiper system, comprising:
    the assembly according to claim 1;
    a connector fixed to said wiper; and
    an adapter for attaching the connector to said wiper holder.

13. A device according to claim 12, wherein said adapter comprises holding means for holding on to the wiper holder in the working position, said lever comprising means for locking said holding means, to retain the adapter on the wiper holder in the working position.

14. The device according to claim 13, wherein the adapter is connected to the connector to be mounted on the wiper holder with a degree of pivoting about a first rotation axis, said adapter being configured to be mounted on the wiper holder in a mounting/removal direction that is located in a plane perpendicular to said first rotation axis.

15. The device according to claim 14, wherein said lever is able to rotate about a second rotation axis, said second axis belonging to the end piece and being parallel to the first rotation axis.

16. The device according to claim 14, wherein the holding means comprise at least one lug that is retractable in a direction known as the retraction direction, said retraction direction comprising a component parallel to said first rotation axis.

17. The device according to claim 16, wherein said lugs(s) is/are able to be housed in the working position inside one or more slots provided in the wiper holder.

18. The device according to claim 16, wherein said locking means comprise at least one projecting part produced in one piece with a body of the lever, said projecting part(s) defining a third abutment that is able to prevent the retraction of said lugs(s) in the working position.

19. The device according to claim 17, wherein said lugs and/or said slot(s) is/are configured to allow the retraction of the lug(s) in the service position.

20. A vehicle windscreen wiper system comprising:
    a wiper;
    a wiper holder; and the connection device according to claim 12 for attaching said wiper to said wiper holder.

\* \* \* \* \*